US008708546B2

(12) United States Patent
Huang

(10) Patent No.: US 8,708,546 B2
(45) Date of Patent: Apr. 29, 2014

(54) BACKLIGHT MODULE

(75) Inventor: Chong Huang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 158 days.

(21) Appl. No.: 13/508,723

(22) PCT Filed: Mar. 15, 2012

(86) PCT No.: PCT/CN2012/072349
§ 371 (c)(1),
(2), (4) Date: May 8, 2012

(87) PCT Pub. No.: WO2013/120295
PCT Pub. Date: Aug. 22, 2013

(65) Prior Publication Data
US 2013/0208504 A1 Aug. 15, 2013

(30) Foreign Application Priority Data
Feb. 15, 2012 (CN) .......................... 2012 1 0034015

(51) Int. Cl.
*F21V 7/04* (2006.01)
(52) U.S. Cl.
USPC ......... 362/634; 362/97.1; 362/97.2; 362/632; 362/633
(58) Field of Classification Search
USPC ...................... 362/97.1, 97.2, 632, 633, 634; 248/220.31
See application file for complete search history.

(56) References Cited

U.S. PATENT DOCUMENTS

| 7,505,668 B2 * | 3/2009 | Hong | 385/146 |
| 7,883,259 B2 * | 2/2011 | Hung et al. | 362/634 |
| 8,456,592 B2 * | 6/2013 | Go et al. | 349/65 |

FOREIGN PATENT DOCUMENTS

| CN | 1896830 A | 1/2007 |
| CN | 201489240 U | 5/2010 |

* cited by examiner

*Primary Examiner* — Stephen F Husar
*Assistant Examiner* — James Cranson, Jr.
(74) *Attorney, Agent, or Firm* — Cheng-Ju Chiang

(57) ABSTRACT

A backlight module includes a backboard, a reflection plate mounted inside the backboard, a light guide board arranged on the reflection plate, and an optic film arranged on the light guide board. The light guide board includes a main body and a plurality of upper and lower positioning pegs projecting from upper and lower surfaces of the main body. The optic film forms first positioning holes corresponding to the upper positioning pegs. The reflection plate forms second positioning holes corresponding to the lower positioning pegs. The backboard forms positioning channels corresponding to the lower positioning pegs. The first positioning holes of the optic films are fit over the upper positioning pegs of the light guide board and the lower positioning pegs are respectively set through the second positioning holes of the reflection plate to be received in the positioning channels of the backboard.

10 Claims, 2 Drawing Sheets

BACKLIGHT MODULE

BACKGROUND OF THE INVENTION

1. Field of the Invention

The present invention relates to the technical field of liquid crystal displaying, and in particular to a backlight module.

2. The Related Arts

Liquid crystal display (LCD) has a variety of advantages, such as compact device size, low power consumption, and being free of radiation, and is thus widely used. Most of the LCDs that are currently available in the market are backlighting LCDs, which comprise a liquid crystal panel and a backlight module. The working principle of the liquid crystal panel is that liquid crystal molecules interposed between two parallel glass plates and a plurality of vertical and horizontal fine electrical wires is arranged between the two glass plates, whereby the liquid crystal molecules are controlled to change direction by application of electricity to refract light emitting from the backlight module for generating images. Since the liquid crystal panel itself does not emit light, light must be provided by the backlight module in order to generate images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source to directly provide lighting to the liquid crystal panel. The side-edge backlight module arranged an LED light bar of light source at an edge of a backboard that is located rearward of one side of the liquid crystal panel. The LED light bar emits light that enters a light guide plate through a light incident face of the light guide plate and is projected out through a light exit face after being reflected and diffused to thereby form a planar light source to be provided to the liquid crystal panel.

The side-edge backlight module comprises a backboard, a backlight source mounted on the backboard, a reflection plate, a light guide board, and optic films. To assemble the backlight module, the optic films, the light guide board, and the reflection plate must be properly positioned first before the optic films, the light guide board, and reflection plate are assembled inside the backboard. The conventional way of positioning is to riveting the optic films, the light guide board, and the reflection plate to the backboard with rivets. Such a positioning manner with riveting is generally hard to operate and needs high cost and may affect the backlighting to some extents.

SUMMARY OF THE INVENTION

An objective of the present invention is to provide a backlight module, which realizes excellent positioning of optic films, a light guide board, and a reflection plate by providing positioning pegs on upper and lower surfaces of the light guide board, so that the structure is simple and the cost is lowered.

To achieve the objective, the present invention provides a backlight module, which comprises: a backboard, a reflection plate mounted inside the backboard, a light guide board arranged on the reflection plate, and an optic film arranged on the light guide board. The light guide board comprises a main body and a plurality of upper positioning pegs and lower positioning pegs respectively projecting from upper and lower surfaces of the main body. The optic film forms first positioning holes corresponding to the upper positioning pegs. The reflection plate forms second positioning holes corresponding to the lower positioning pegs. The backboard forms positioning channels corresponding to the lower positioning pegs. The first positioning holes of the optic films are respectively fit over the upper positioning pegs of the light guide board, and the lower positioning pegs of the light guide board are respectively set through the second positioning holes of the reflection plate to be received in the positioning channels of the backboard.

The main body of the light guide board comprises a base and a plurality of positioners mounted to the base in such a way that upper and lower surfaces of the positioners are substantially flush with upper and lower surfaces of the base and the upper and lower positioning pegs are formed on the upper and lower surfaces of the positioners.

The base forms receiving notches corresponding to the positioners and the positioners are respectively received in the receiving notches.

The positioners are T-shaped and the receiving notches of the base are correspondingly T-shaped.

The positioners are bonded to side edges of the main body.

The positioners and the base are made of the same material.

The positioners and the base are made of different materials.

The upper and lower positioning pegs and the main body are integrally formed with each other.

The upper and lower positioning pegs are bonded to the upper and lower surfaces of the main body of the light guide board.

The upper and lower positioning pegs are cylindrical and the first positioning holes, the second positioning holes, and the positioning channels are circular.

The efficacy of the present invention is that the present invention provides a backlight module, wherein positioning of optic films, a light guide board, a reflection plate, and a backboard is done through forming a plurality of positioning pegs on upper and lower surfaces of the light guide board and also forming a plurality of positioning holes in the optic films and the reflection plate and a plurality of positioning channels in the backboard to both correspond to the plurality of positioning pegs by which the optic films, the light guide board, and the reflection plate are mounted inside the backboard without applying rivets that are commonly used in the known techniques thereby simplifying the manufacturing process of the backlight module, making the operation easy, structure simple, and cost lowered. Meanwhile, the positioning pegs can be made of the same material as that of the light guide board so as not to affect backlighting.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to preferred embodiments of the present invention and the attached drawings.

Figure 1:
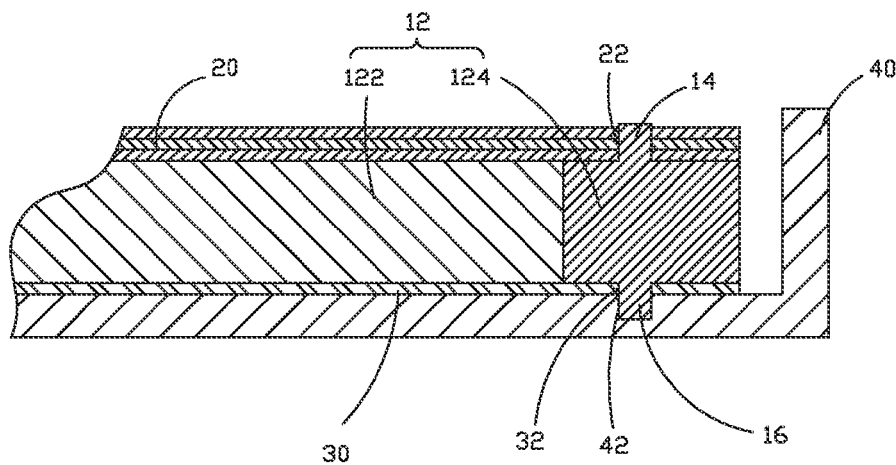
FIG. 1 is a cross-sectional view showing a backlight module according to an embodiment of the present invention.
Figure 2:
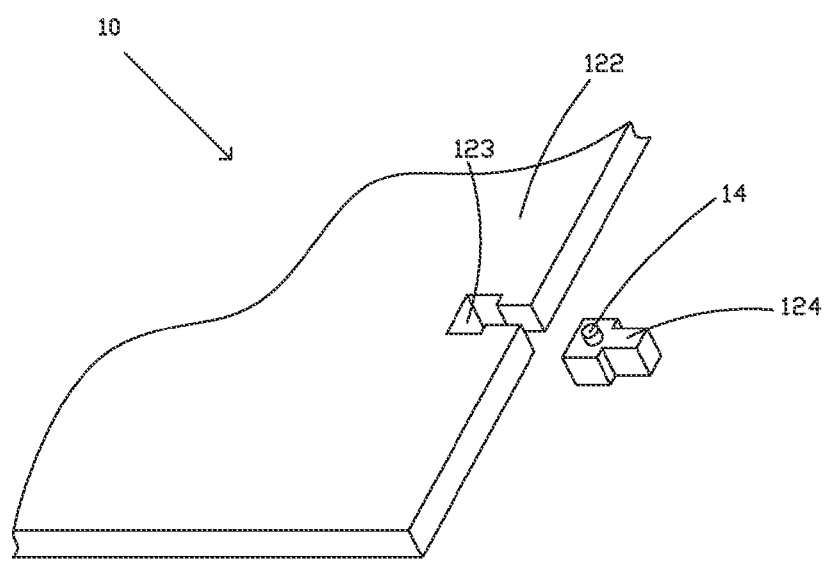
FIG. 2 is an exploded view of a light guide board of FIG. 1.

With reference to FIGS. 1 and 2, the present invention provides a backlight module, which comprises: a backboard 40, a reflection plate 30 mounted inside the backboard 40, a light guide board 10 arranged on the reflection plate 30, and optic films 20 arranged on the light guide board 10. The light guide board 10, the optic films 20, and the reflection plate 30 are all located inside the backboard 40.

The light guide board 10 comprises a main body 12 and a plurality of upper positioning pegs 14 and lower positioning pegs 16 respectively projecting from upper and lower surfaces of the main body 12. The main body 12 comprises a base 122 and a plurality of positioners 124 mounted to the base 122. The upper and lower positioning pegs 14, 16 are respectively mounted to upper and lower surfaces of the positioners 124. The positioners 124 are of an inverted T-shape. The base 122 forms T-shaped receiving notches 123 respectively corresponding to the positioners 124. The positioners 124 are respectively received and retained in the receiving notches 123. After the assembling, the upper and lower surfaces of the positioners 124 are substantially flush with the upper and lower surfaces of the base 122 with the upper and lower positioning pegs 14, 16 respectively projecting beyond the upper and lower surfaces of the base 122. Preferably, the positioners 124 and the upper and lower positioning pegs 14, 16 are made of the same material, which can be the same as or different from the material that makes the base 122.

The positioners 12 are not limited to T-shape. Further, the upper and lower positioning pegs 14, 16 may be of a shape that is varied according to an actual structure. In the instant embodiment, the upper and lower positioning pegs 14, 16 are both cylindrical, but are not limited to such a cylindrical configuration.

The optic films 20 form first positioning holes 22 corresponding to the upper positioning pegs 14. The first positioning holes 22 are shaped to correspond to the outer configuration of the upper positioning pegs 14. In the instant embodiment, the first positioning holes 22 are circular to correspond to the upper positioning pegs 14.

The reflection plate 30 forms second positioning holes 32 corresponding to the lower positioning pegs 16. The second positioning holes 32 are shaped to correspond to the outer configuration of the lower positioning pegs 16. In the instant embodiment, the second positioning holes 32 are circular to correspond to the lower positioning pegs 16.

The backboard 40 forms positioning channels 42 corresponding to the lower positioning pegs 16. The positioning channels 42 are shaped to correspond to the outer configuration of the lower positioning pegs 16. In the instant embodiment, the positioning channels 42 are circular to correspond to the lower positioning pegs 16.

To assemble, the first positioning holes 22 of the optic films 20 are fit over the upper positioning pegs 14 of the light guide board 10. The lower positioning pegs 16 of the light guide board 10 are respectively put through the second positioning holes 32 of the reflection plate 30 to be received in the positioning channels 42 of the backboard 40 to join the light guide board 10, the optic films 20, the reflection plate 30, and the backboard 40 together, avoiding applying riveting that is required in the known techniques thereby simplifying the assembling operation of the backlight module and ensuring easy operation and at the same time reducing manufacturing cost.

Figure 3:
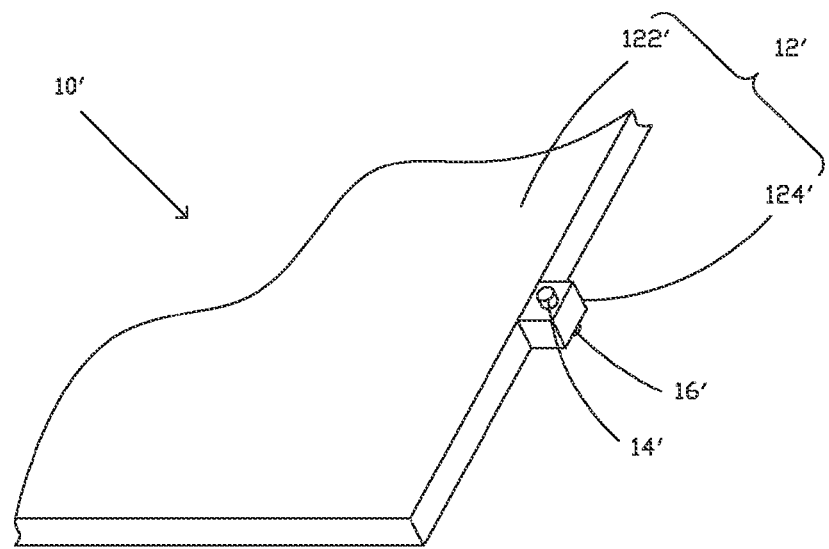
FIG. 3 is a perspective view showing a light guide board of a backlight module according to another embodiment of the present invention.

Referring to FIG. 3, a perspective view is given to show a light guide board of a backlight module according to another embodiment of the present invention. In the instant embodiment, a light guide board 10' comprises a main body 12' and upper and lower positioning pegs 14', 16' projecting from upper and lower surfaces of the main body 12'. The main body 12' comprises a base 122' and a plurality of positioners 124' mounted to the base 122'. The upper and lower positioning pegs 14', 16' are mounted to upper and lower surfaces of the positioners 124'. The positioners 124' are mounted to side edges of the base 122'. The positioners 124' can be integrally formed with the base 122' or alternatively be bonded to the side edges of the base 122' by adhesives. The operation of the instant embodiment is the same as that of the previous embodiment and repeated description is omitted herein.

Figure 4:
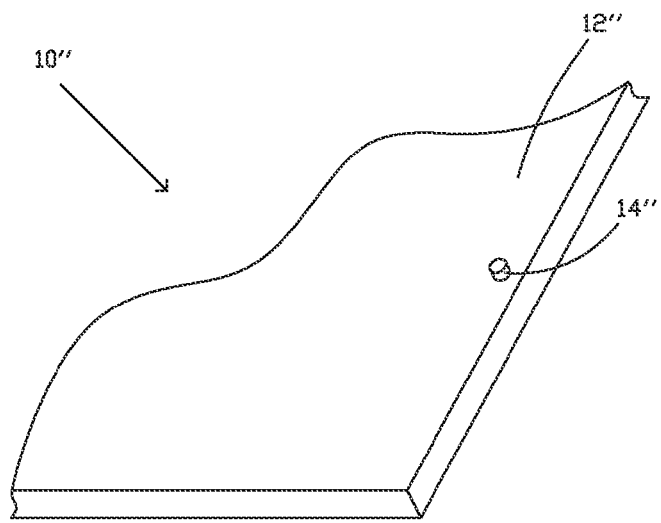
FIG. 4 is a perspective view showing a light guide board of a backlight module according to a further embodiment of the present invention.

Referring to FIG. 4, a perspective view is given to show a light guide board of a backlight module according to a further embodiment of the present invention. In the instant embodiment, a light guide board 10" comprises a main body 12", upper positioning pegs 14" mounted to an upper surface of the main body 12", and lower positioning pegs (not shown) mounted to a lower surface of the main body 12". The upper positioning pegs 14" and the lower positioning pegs can be integrally formed with the main body 12" or alternatively be bonded to the upper and lower surfaces of the main body 12" by adhesives. The operation of the instant embodiment is the same as those of the previous embodiments and repeated description is omitted herein.

In summary, the present invention provides a backlight module, wherein positioning of optic films, a light guide board, a reflection plate, and a backboard is done through forming a plurality of positioning pegs on upper and lower surfaces of the light guide board and also forming a plurality of positioning holes in the optic films and the reflection plate and a plurality of positioning channels in the backboard to both correspond to the plurality of positioning pegs by which the optic films, the light guide board, and the reflection plate are mounted inside the backboard without applying rivets that are commonly used in the known techniques thereby simplifying the manufacturing process of the backlight module, making the operation easy, structure simple, and cost lowered. Meanwhile, the positioning pegs can be made of the same material as that of the light guide board so as not to affect backlighting.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backboard, a reflection plate mounted inside the backboard, a light guide board arranged on the reflection plate, and an optic film arranged on the light guide board, the light guide board comprising a main body and a plurality of upper positioning pegs and lower positioning pegs respectively projecting from upper and lower surfaces of the main body, the optic film forming first positioning holes corresponding to the upper positioning pegs, the reflection plate forming second positioning holes corresponding to the lower positioning pegs, the backboard forming positioning channels corresponding to the lower positioning pegs, the first positioning holes of the optic films being fit over the upper positioning pegs of the light guide board, the lower positioning pegs of the light guide board being respectively set through the second positioning holes of the reflection plate to be received in the positioning channels of the backboard.

2. The backlight module as claimed in claim 1, wherein the main body of the light guide board comprises a base and a plurality of positioners mounted to the base in such a way that upper and lower surfaces of the positioners are substantially flush with upper and lower surfaces of the base and the upper and lower positioning pegs are formed on the upper and lower surfaces of the positioners.

3. The backlight module as claimed in claim 2, wherein the base forms receiving notches corresponding to the positioners and the positioners are respectively received in the receiving notches.

4. The backlight module as claimed in claim 3, wherein the positioners are T-shaped and the receiving notches of the base are correspondingly T-shaped.

5. The backlight module as claimed in claim 2, wherein the positioners are bonded to side edges of the main body.

6. The backlight module as claimed in claim 2, wherein the positioners and the base are made of the same material.

7. The backlight module as claimed in claim 2, wherein the positioners and the base are made of different materials.

8. The backlight module as claimed in claim 1, wherein the upper and lower positioning pegs and the main body are integrally formed with each other.

9. The backlight module as claimed in claim 1, wherein the upper and lower positioning pegs are bonded to the upper and lower surfaces of the main body of the light guide board.

10. The backlight module as claimed in claim 1, wherein the upper and lower positioning pegs are cylindrical and the first positioning holes, the second positioning holes, and the positioning channels are circular.

\* \* \* \* \*